J. F. FROMM.
BRUSHING MACHINE.
APPLICATION FILED SEPT. 29, 1909.
985,521.
Patented Feb. 28, 1911.
6 SHEETS—SHEET 2.
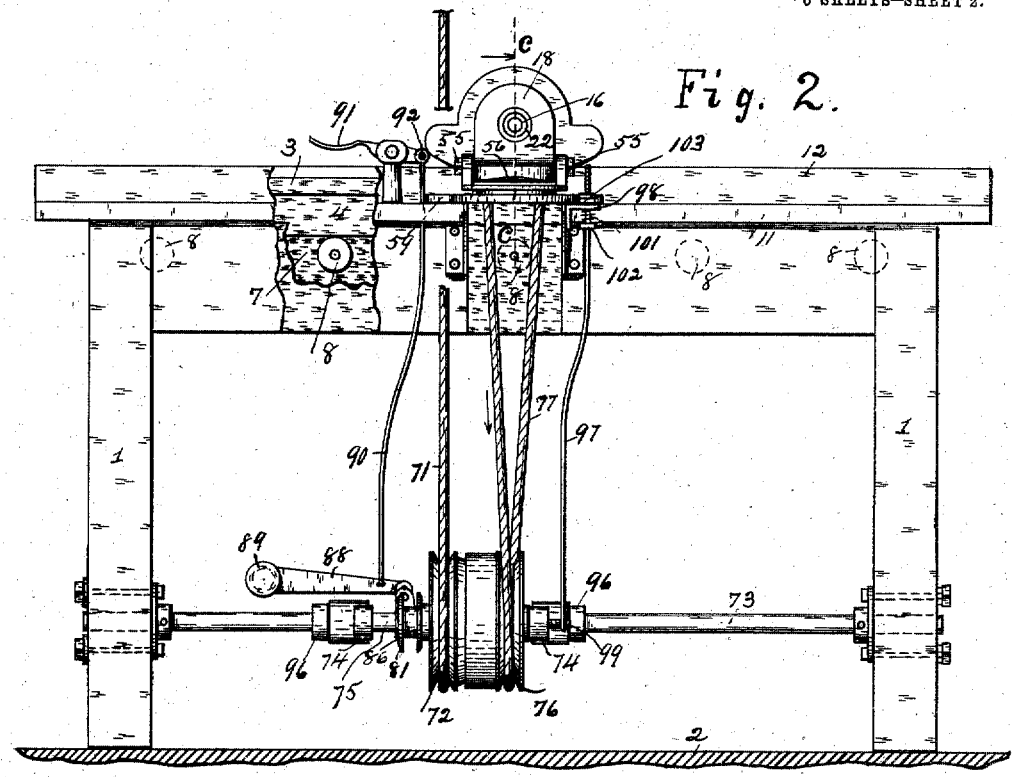
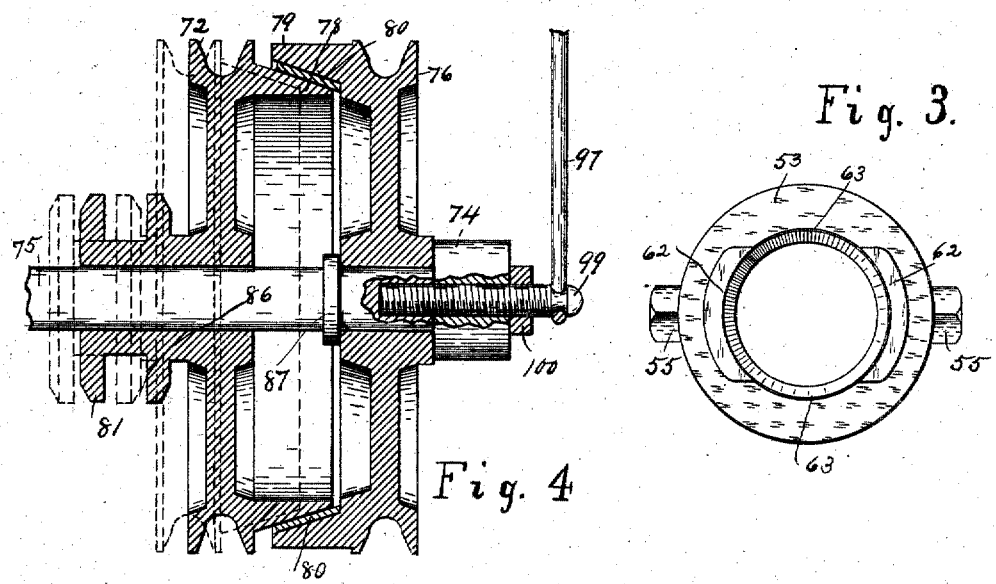
Attest:
A. M. Whitmore.
C. E. Rendsland.
Inventor:
John F. Fromm,
by E. B. Whitmore, Atty.

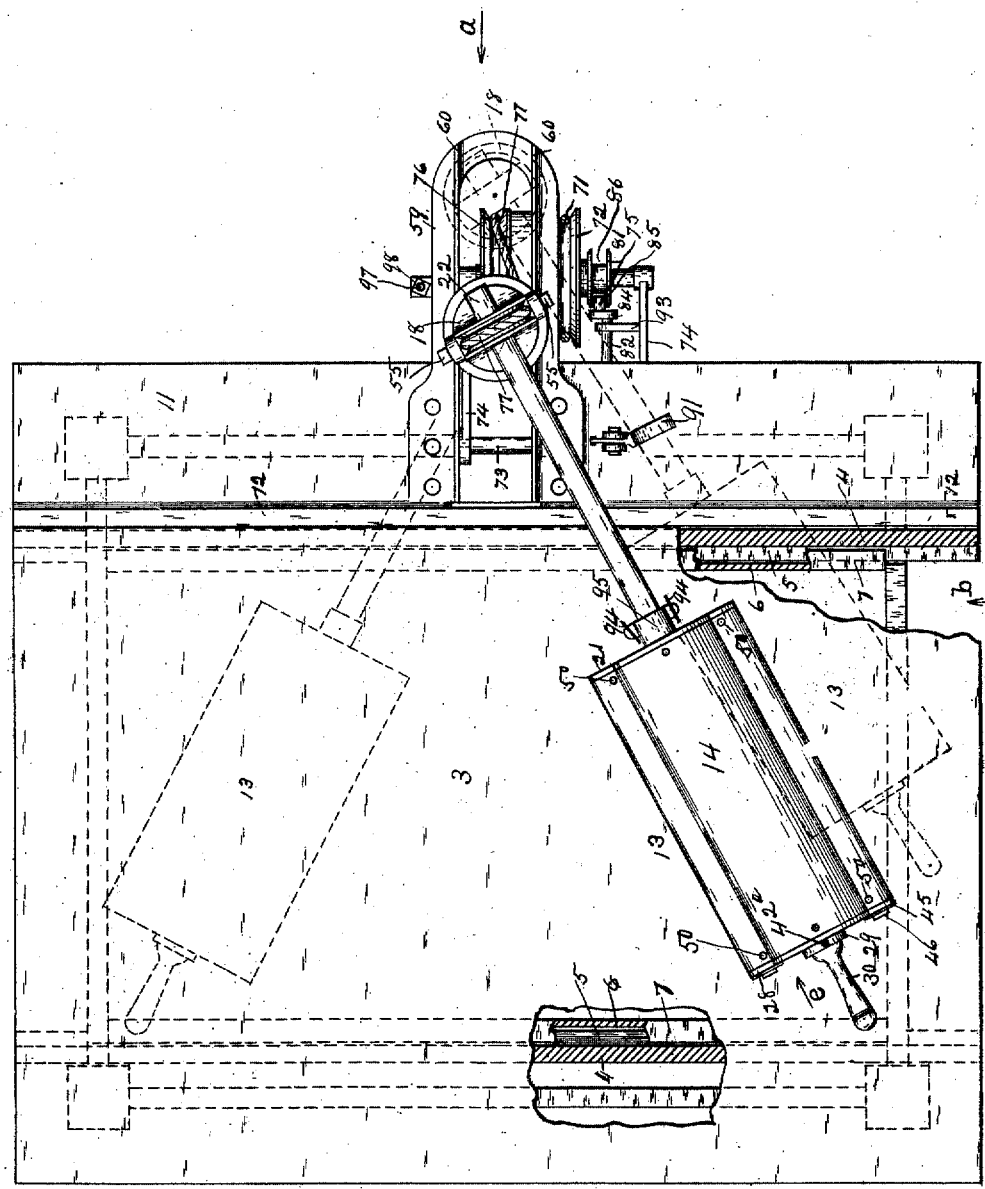

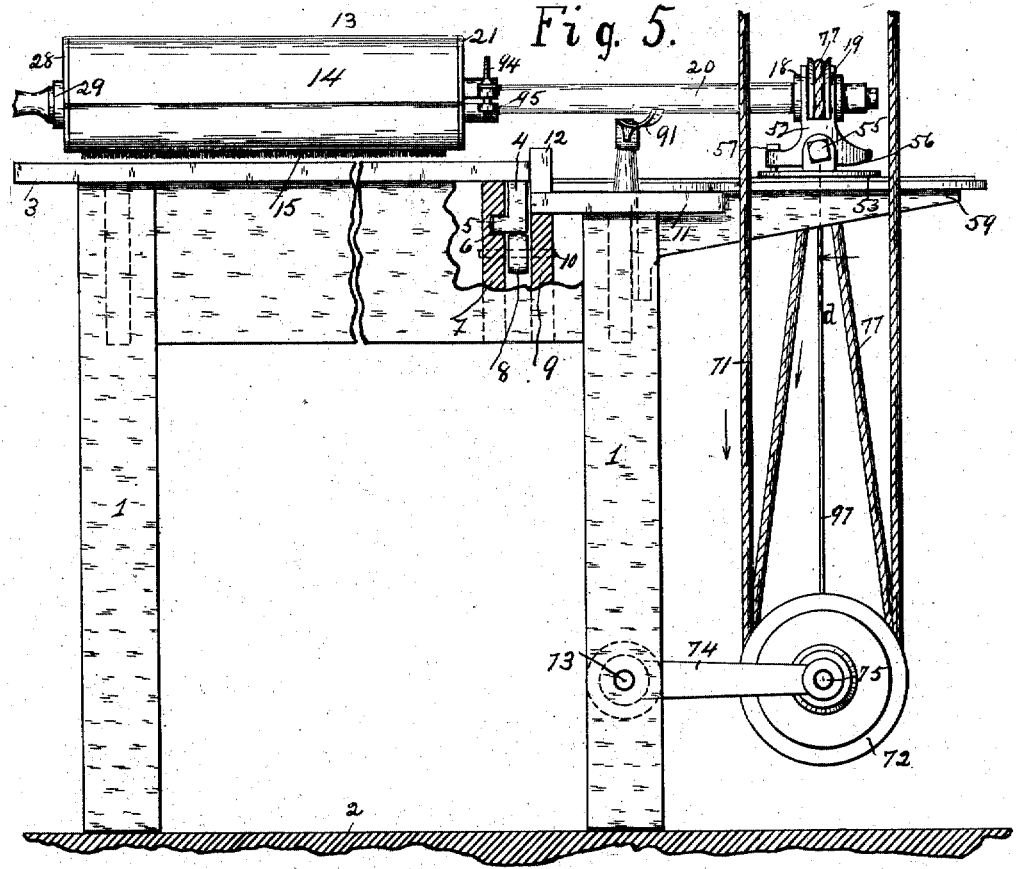
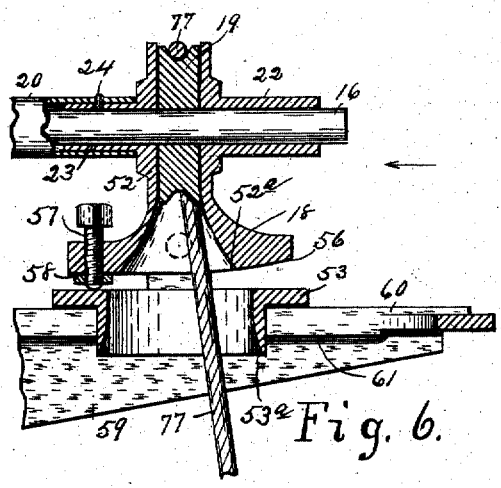
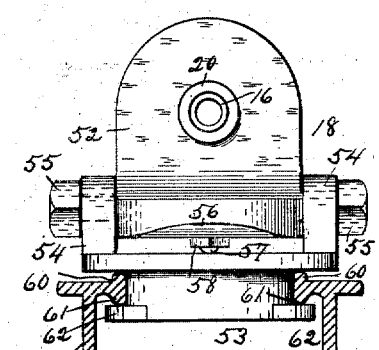

J. F. FROMM.
BRUSHING MACHINE.
APPLICATION FILED SEPT. 29, 1909.
985,521.
Patented Feb. 28, 1911.
6 SHEETS—SHEET 4.
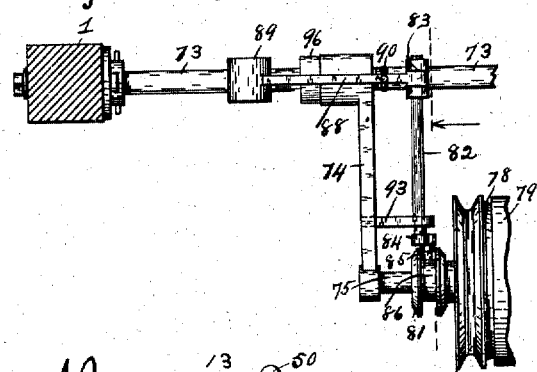
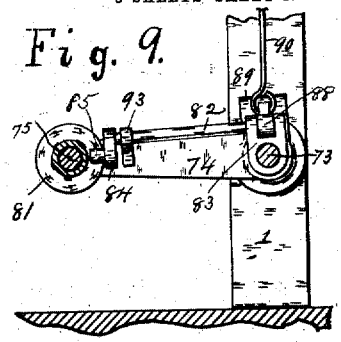
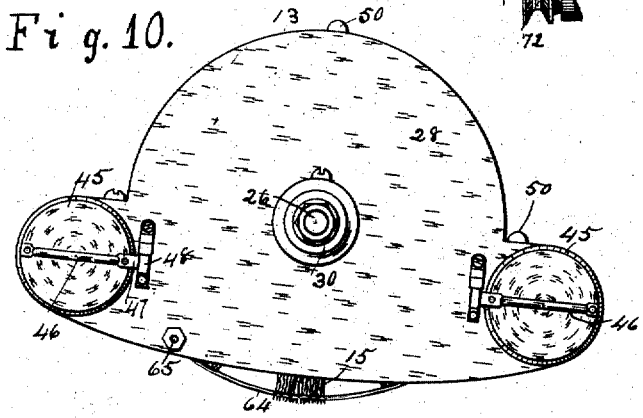
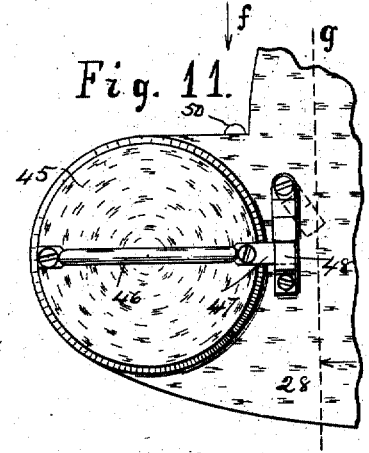
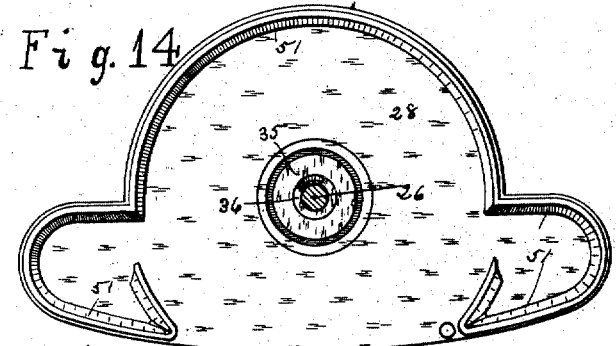
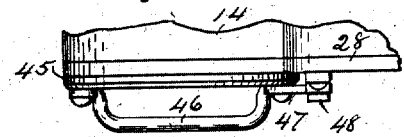
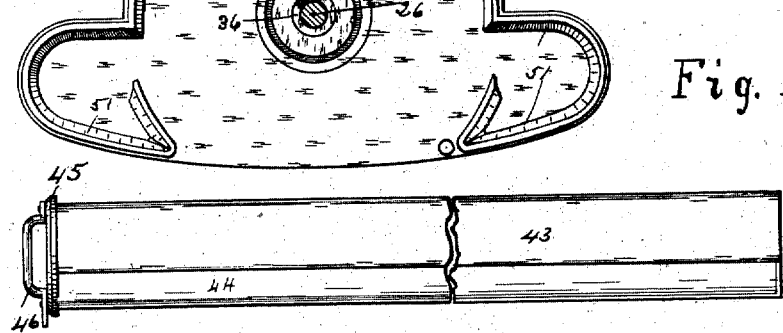
Attest:
A. M. Whitmore.
C. E. Sundeland.
Inventor:
John F. Fromm,
by E. B. Whitmore, Atty.

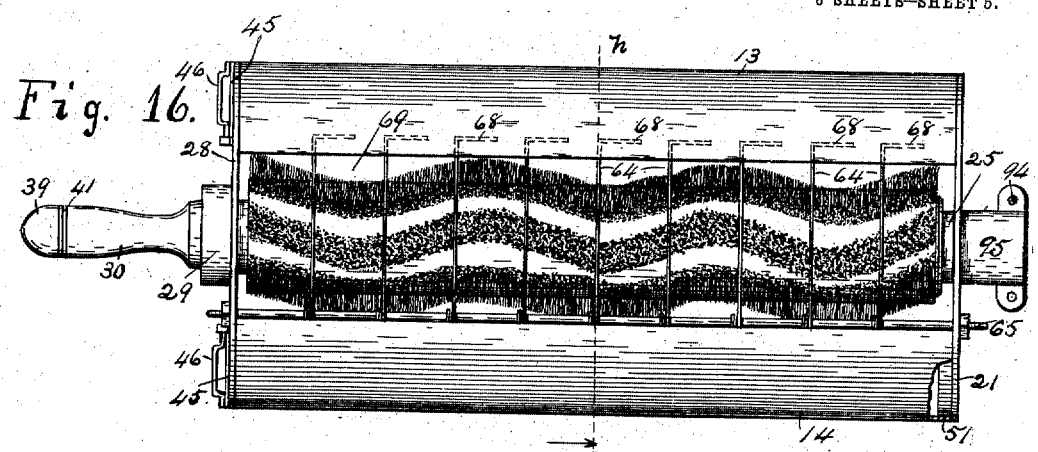
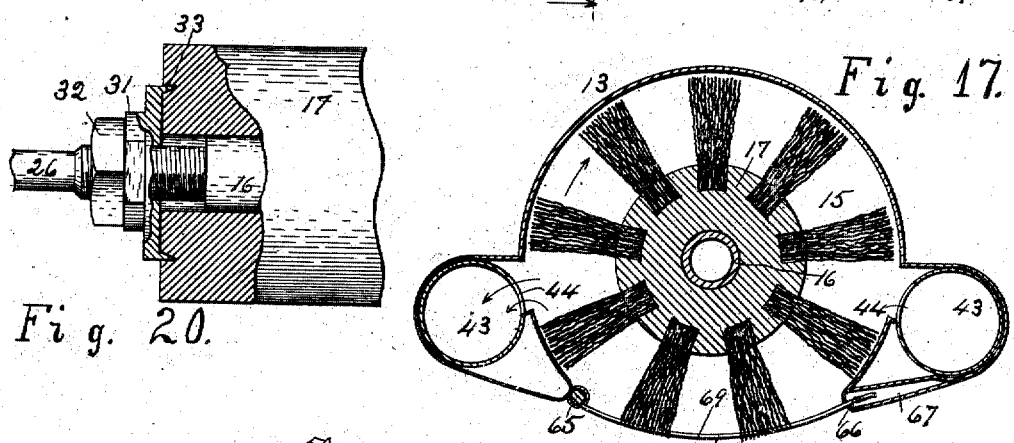
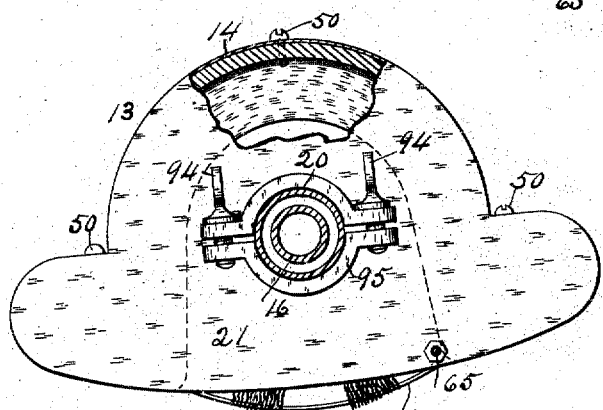
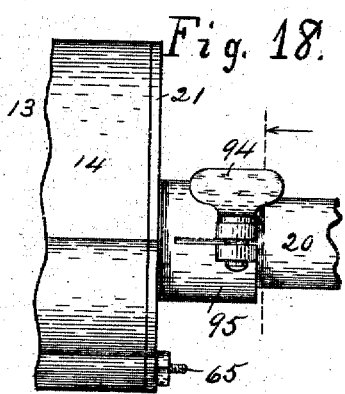

J. F. FROMM.
BRUSHING MACHINE.
APPLICATION FILED SEPT. 29, 1909.
985,521.
Patented Feb. 28, 1911.
6 SHEETS—SHEET 6.
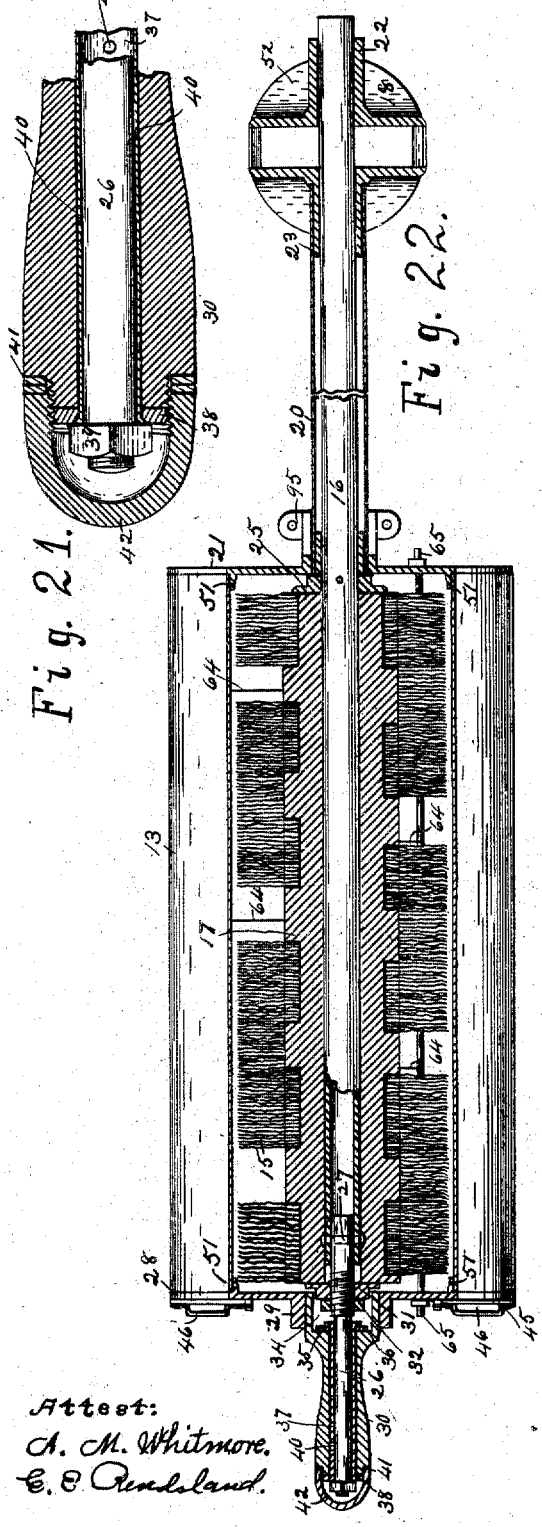
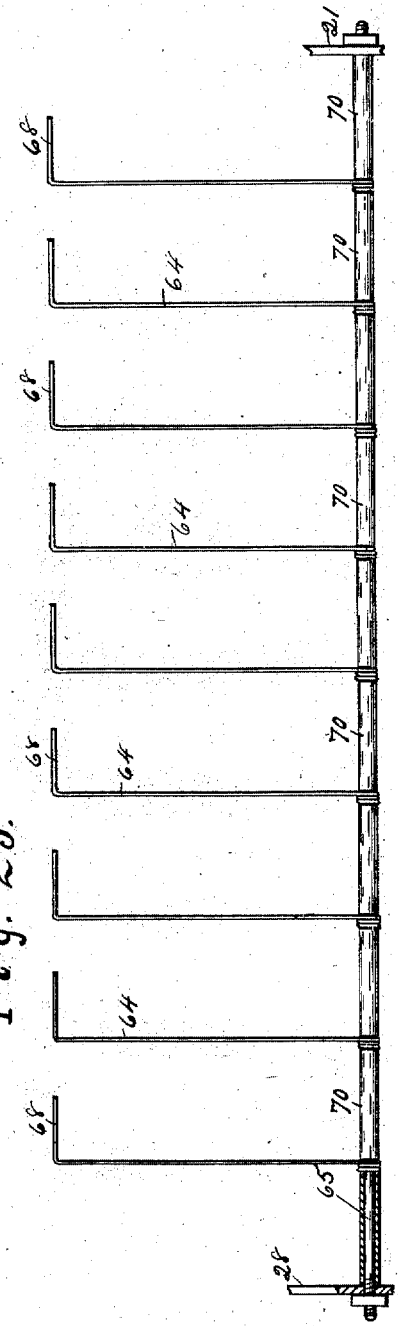
Attest:
A. M. Whitmore.
E. E. Rendsland.
Inventor:
John F. Fromm,
by E. B. Whitmore, Atty.
THE NORRIS PETERS CO., WASHINGTON, D. C.

UNITED STATES PATENT OFFICE.

JOHN F. FROMM, OF ROCHESTER, NEW YORK.

BRUSHING-MACHINE.

985,521.  Specification of Letters Patent.  Patented Feb. 28, 1911.

Application filed September 29, 1909. Serial No. 520,089.

*To all whom it may concern:*

Be it known that I, JOHN F. FROMM, of Rochester, in the county of Monroe and State of New York, have invented a new and useful Improvement in Brushing-Machines, which improvement is fully set forth in the following specification and shown in the accompanying drawings.

This invention relates to certain new and useful improvements in brushing machines, designed more especially for the use of tailors and manufacturers of suits of clothes, as well as for those who do repairing and pressing of clothes. It is also useful for other general purposes in the matter of brushing clothes or fabrics of any kind or nature. It is a rapid power brush for brushing and cleaning garments, either for removing the dust and dirt from new clothes or for brushing and cleaning garments that have been worn and repaired. It is applicable to use for brushing overcoats, ladies' coats, jackets, raincoats and other garments which have become smirched with dust or dirt.

The present invention has for its objects among others to provide an efficient machine for this purpose, easily manipulated, not liable to get out of order and which shall be most efficient in use. I provide a top board so mounted as to be readily moved over the support or table as occasion may require. The brush body is mounted to swing over this support and top board, convenient means being provided for rotating the brush. I provide a housing with dust receptacles into which the dust swept off from the clothes by the brush is received, said receptacles being designed to be removed when necessary to clear them of the dust collected.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification and in which—

Figure 1 is a plan of the brushing machine with parts shown in various positions by full and dotted lines, and parts broken away. Fig. 2 is a rear elevation, seen as indicated by arrow *a* in Fig. 1, parts being broken away. Fig. 3 is a plan of the underside or face of the swivel head, detached. Fig. 4 is a central longitudinal section of the lower twin cord-pulleys and some associated parts, parts being shown in two positions by full and dotted lines. Fig. 5 is an end elevation of the machine seen as indicated by arrow *b* in Fig. 1, parts being broken away. Fig. 6 is a vertical central section of the swivel head and some coacting parts, taken on the dotted line *c c* in Fig. 2. Fig. 7 is a rear elevation of the swivel head, indicated by arrow in Fig. 6, the supporting slide being transversely sectioned on the vertical dotted line *d* in Fig. 5. Fig. 8 is a plan, looking downward, of parts of the mechanism carrying the twin cord-pulleys and other coacting parts, the adjacent leg of the table being horizontally sectioned. Fig. 9 is a side elevation of some of the parts shown in Fig. 8, seen as indicated by the arrow, parts being transversely sectioned on the dotted line at the point of the arrow. Fig. 10 is a front-end elevation of the brush body seen as indicated by arrow *e* in Fig. 1, the cap-piece or terminal of the handle being omitted. Fig. 11 is a view of a portion of the end of the brush body further showing operating parts, a part being shown in two positions by full and by dotted lines. Fig. 12 is a view of parts of the brush body seen as indicated by arrow *f* in Fig. 11. Fig. 13 is a vertical section of the head of the brush body on the dotted line *g* in Fig. 11, further showing the locking mechanism for a dust drawer. Fig. 14 shows the inner face of the front head of the brush body with the inner end of the handle and associated parts. Fig. 15 shows a plan of a dust drawer detached, a part being broken out. Fig. 16 is a plan of the under side of the brush body, a small part being broken away. Fig. 17 is a transverse section of the brush body on the dotted line *h* in Fig. 16, further showing the interior construction. Fig. 18 is a side elevation of parts at the rear end of the brush body showing means for securing said body to the carrying sleeve. Fig. 19 is an elevation of the rear head of the brush body seen as indicated by arrow in Fig. 18, the sleeve and brush rod being transversely sectioned on the dotted line at the point of the arrow, and a part broken away. Fig. 20 shows in elevation portions at the front end of the brush cylinder with the bristles omitted, portions being in central longitudinal section. Fig. 21 is a central longitudinal section of main portions of the operating handle, with portions broken away, further showing the detail of construction. Fig. 22 is a plan of the brush body and brush with other coacting parts, centrally and longitudinally sectioned. Fig. 23 is a plan of the wire guard detached, parts being in central longitudinal section. Figs. 11, 12, 13 and 21 are drawn to full size. The other figures are drawn to scales smaller than full size, varying from one-seventh to two-thirds the full size.

Like numerals of reference indicate like parts in the several views.

Referring to the drawings, 1 designates a table, stand or other support. This may be of any desired size and form of construction designed to rest upon the floor or other support 2 and to support all of the operating parts of the device.

The top board 3 is provided upon its under side with two longitudinal strips 4, one near each edge, these strips being provided at their lower edges with lateral portions 5 which are designed to occupy grooves 6 in the longitudinal parallel slide members 7 forming a part of the frame of the table or support 1. Each of the strips 4 rests upon a series of rollers 8 by means of which the top board 3 may be moved to the right or left over the frame of the table as occasion may require. The article or articles to be brushed are designed to be supported upon this top board. These rollers 8 are arranged in a horizontal row, as indicated in Fig. 2 by full and dotted lines, between the slide members 7 and the parallel frame boards 9, each being mounted upon a short shaft 10, as seen clearly in Fig. 5. It is to be understood that the arrangement of the rollers is the same under the front part of the table, the left hand side of Fig. 5, although not shown therein.

The table or support 1 is provided with a horizontal ledge 11 at the rear side which is on a plane lower than the board 3, there being a horizontal strip or member 12 at its inner edge adjacent to the rear edge of the said board 3. This ledge 11 is supported upon the rear strip 9 of the frame of the table and upon the adjacent uprights or legs of the table, as will be clearly understood upon reference to Fig. 5.

13 is a brush body shown in Figs. 1, 5 and several other views. It is supported so as to swing over the table or top board and also to have a longitudinal motion on its support, as will soon be made clear. The brush body consists of a sheet metal housing 14 inclosing a brush 15 carried upon the shaft 16 which is preferably tubular, as seen in Figs. 17, 19 and 22, to which the cylindrical body 17, preferably of wood, is secured. This shaft 16 extends rearwardly through a hollow swivel head or swinging member 18 containing a cord pulley 19 which is secured to said shaft and by which the brush is rotated through means soon to be described.

20 is a sleeve or tubular member inclosing a portion of said shaft 16, as seen best in Fig. 22. It is disposed between the head 21 of the brush body and the swivel head 18, said head 18 being formed with central oppositely disposed lateral projections 22 and 23, as seen clearly in Figs. 6 and 22, the projection 23 snugly telescoping within the end of the sleeve or tubular member 20 to which it is made rigid by any suitable means, in this instance, such means being shown as a pin 24, so that the sleeve and the head may move as a single body. The extension 22 forms a convenient bearing for the outer end of the brush shaft 16, as will be clearly seen from Fig. 6.

As shown clearly in Figs. 16 and 22, 25 is a flanged collar disposed within the brush body 13 and encircling the shaft 16, being secured both to said shaft and to the cylindrical wooden brush body 17. As seen clearly in Fig. 22, the shaft 16 does not extend entirely through the brush body but stops a little short of the front end thereof, there being telescoped within it an axial rod 26, the end of which is secured within the shaft 16 by any suitable means, as, for instance, by the pin or the like 27, seen clearly in Fig. 22. The forward metal head 28 of the brush body 13 is formed with a central hub 29 which receives within it an operating handle 30 coaxial with the said rod, there being a flanged hub 31 threaded on the rod 26, as seen clearly in Fig. 22, said flanged hub being against the adjacent end of the body 17 of the brush, suitable means, as a jam nut 32, having threaded engagement with the axial rod 26 being turned up snugly against the said hub 31 to hold the same fixedly in place. This flanged hub 31 is shown on an enlarged scale in Fig. 20 wherein it will be seen as formed with a peripheral flange 33 designed to be embedded in the end of the body 17 to prevent the latter from bursting by centrifugal action while rapidly revolving during the operation of brushing the clothes.

The handle 30, as seen best in Figs. 21 and 22, is formed with a chamber 34 at its inner end, the wall of which is received within the hub 29 and incloses the nut 32 and also a ring or washer 35 receiving against it the flanged end or head 36 of an inner sleeve or tubular member 37 of the handle, as seen in Figs. 21 and 22. At its outer end, this sleeve or tubular member 37 passes through a ring 38, as seen best in Fig. 21, which is rigid with the tube 37, the latter being outwardly flanged or riveted at its outer end over the said ring, a nut 39 screwed on the outer end of the axial rod 26 being disposed outside the said ring. The tube 37 is pierced with a plurality of oil holes 40, the rod 26 turning within the said sleeve or tubular member and the nut 39 on the outer end of the rod not pinching the ring 38 or the end of the tube, the latter, with the ring 35 and the ring 38, being stationary with the handle, with the rod 26 turning within the same.
The handle body is reduced at its extreme outer end to receive packing rings or the like 41, as seen clearly in Fig. 21, said reduced extreme end and the ring 38 being threaded, as seen in Fig. 21, to receive the threaded inner end of the cap piece or terminal 42 of the handle, as seen clearly in Fig. 21, the said cap piece being hollow to receive the projecting end of the rod 26 and the nut 39, as clearly shown in said Fig. 21. These rings serve to prevent escape of lubricant employed within the handle. The handle 30 is removable from the head 28. When in place thereon, it is held in any suitable manner, as, for instance, by a screw or pin 42$^a$ see Fig. 1.

The housing 14 is provided with a pair of dust drawers 43, seen clearly in Figs. 10, 11, 15, and 17, there being one at each side of the said housing near the bottom, one of said dust drawers or receptacles being shown detached in Fig. 15. These dust drawers or receptacles are for the purpose of receiving the dust and dirt swept off of the clothes by the brush. These drawers have longitudinal openings 44 upon their inner faces, that is, upon the portions adjacent the chamber within which the brush revolves and through which the dust passes into said receptacles, as will be evident from the arrows in Fig. 17. These drawers are formed, preferably, with circular heads 45, as seen clearly in Figs. 10, 11, 12 and 16, meeting the front head 28 when the drawers are in place, as seen clearly in Figs. 11, 12 and 16. Handles 46 of any suitable character are secured to the heads 28, as seen in Figs. 11, 12 and 13, a swinging button or retainer 49 being provided for each handle to hold the projecting end or part 47 in place behind a keeper 48, these parts forming a lock or catch to hold the drawers in place against accidental displacement while in use. Disengagement of the button or retainer will allow the drawers to be removed when desired to remove therefrom the dust and dirt collected during the operation of the machine as it is brushed from the clothes being operated upon. The sheet metal housing 14 may be secured to the heads 21 and 28 in any suitable manner. In the present instance, I have shown simple means, as screws 50, entering inwardly projecting flanges 51 of the said heads, which flanges are best seen in Fig. 22, the screws being seen in Figs. 1, 10, 11 and 19.

The swivel head 18, as seen best in Figs. 6 and 7, comprises a rocking portion 52 mounted upon a sliding base 53, the latter having the uprights or standards 54 in which are mounted screws or the like 55, whereby the rocking portion and sliding base are pivotally joined together. The rocking part 52 is cut away upon its under face, as at 56 in Fig. 6, so that the brush may be lifted or swung upward conveniently over the work on the table. A stop screw 57 adjustably mounted in the rocking portion 52 is provided with a set nut 58 upon the under side of the said rocking portion and, engaging the upper face of the sliding base 53, serves to regulate or control the lowest position of the brush on the table or top board 3 and prevent its dropping too far. This swivel head and the sliding base 53 are mounted upon a slide frame 59, which latter is in the form of a sort of a loop, being hollow and provided with a pair of parallel tracks 60 on its upper surface upon which the base 53 is adapted to slide forward and back, as indicated in Fig. 1. This slide frame 59 is also formed upon its under surface or face with tracks 61 to meet lateral projections 62 of the base 53. From this it will be understood, especially when considered in connection with Fig. 1, that the swivel body 18, as a whole, may slide toward and away from the top board 3 along the slide frame 59 and turn as with a swivel motion upon said frame; the upper portion 52 may also tilt or rock upon the pivots 55. The body of the sliding base 53 is cylindrical or circular in form, a portion having a diameter equal to the space between the two slide portions of said frame 59. The projections 62, as seen best in Fig. 3, are on diametrically opposite sides with spaces 63 between them, so that by turning the swivel head 18 around to the proper position, the whole may be lifted out of the slide frame 59.

As shown clearly in Figs. 3 and 6, the rocking part 52 and the base member 53 are made hollow and flaring, as seen at 52$^a$ and 53$^a$ respectively, so as to provide room for the driving cord soon to be described and which is always more or less twisted from a vertical line, as the brush body is swung and shifted to various positions while in use.

In order to produce the best results, the bristles of the brush are very stiff, and, unless provision is made to prevent it, the cloth in being brushed would be liable to be drawn into the housing through the opening therein upon its under side. For this purpose, I provide guards, preferably of wire, the same being shown at 64 in Figs. 16 and 23. These guards are carried by, and preferably coiled about, a rod 65 piercing both of the heads 21 and 28 of the brush body 13, as seen in Figs. 16 and 22. This rod is at the lower portion of the said brush body, as is seen best in Fig. 17, the wire guards being curved, as seen also in said Fig. 17, and pass through the ends of the bristles of the brush, as will also be evident from said Fig. 17 and also from what is shown in Fig. 10. The free ends of these wires or guards enter freely into openings 66 in a chamber 67 formed within the housing, as seen clearly in Fig. 17. The free ends of these wires are bent laterally, as seen at 68, the said lateral ends being disposed within said chamber. The ends of the bristles project downward through the opening 69 formed in the lower side of the housing, as seen clearly in Figs. 5, 10, 17 and 19, the brush being designed to run at a high rate of speed. The guards 64 are elastic, being formed of some suitable material, as, for instance, spring steel, and when the brush body is pressed down upon the cloth as it is in use, these guards yield inwardly but press the cloth at all times with elastic action and prevent the cloth from being drawn in through the openings 69. The guards move freely through the openings 66 in the chamber 67 as they spring upward when the brush body is pressed against the cloth, the chamber 67 being wide to give the ends of the guards perfect freedom of movement.

As shown clearly in Fig. 23, the guards 64 are separated or spaced apart by short tubes 70 on the rod 65. By this means, all of the guards and the tubes 70 may be removed from the rod 65 when desired, or the rod may be supplied with all of these parts in assembling the different parts of the machine.

71, Figs. 2 and 5, is a driving cord or ligament leading from a driving pulley overhead (not shown), which cord runs around a grooved pulley 72, see Figs. 1, 2, 4, 5 and 8, disposed beneath the slide 59. A shaft 73 is secured between the rear legs of the table or support near the floor and loosely mounted upon this shaft are the rearwardly extending arms 74 which hold at their outer ends a short shaft 75 carrying the twin cord pulleys 72 and 76, the latter directly driving the pulley 19 in the swivel head 18 by means of a cord or the like 77. The pulleys 72 and 76 turn freely on the shaft 75, the pulley 72 being formed with a lateral projecting portion 78, see Fig. 4, entering a correspondingly oppositely projecting portion 79 of the pulley 76, both being inclined or conical, as shown, and there being a band of fibrous frictional material 80 interposed between the acting faces of the conical parts, said fibrous frictional band being made rigid with the surface 78. The pulley 72 also may move slightly longitudinally on the shaft 75 so as to be thrown into or out of contact with the pulley 76 for starting and stopping the brush. These parts, as will be readily understood, form an efficient friction clutch. The shifting of the driving pulley 72 is designed to be effected in the present instance as follows:—The said pulley 72 is formed with a grooved head 81, as seen in Figs. 1, 2, 4, 8 and 9, operated by a shaft 82 extending rearward from a holder 83 on the shaft 73, as seen clearly in Figs. 8 and 9, said shaft being provided with a crank 84 carrying a pin 85 working in the groove 86 of said head 81. A ring or collar 87, rigid with the shaft 75, prevents the pulley 76 from moving laterally on said shaft.

Upon the shaft 82, between the jaws of the holder 83, is rigidly secured the small end of a weighted arm 88, as seen in Figs. 2, 8 and 9, which weighted arm tends to normally keep the driving pulley 72 in contact with the pulley 76 to drive the latter, such position of parts being indicated by full lines in Fig. 4. 89 is the weight on the free end of said arm 88. This arm 88 is connected by means of a rod 90 to one end of a lever 91, as seen at 92 in Fig. 2, which lever is disposed over the ledge 11, as seen in Figs. 1, 2, and 5, by means of which lever the arm 88 may be swung or tilted upward to throw the driving pulley 72 back or away from the pulley 76 into the position shown by dotted lines in Fig. 4, when it is desired to stop the brush from revolving. When the brush is idle, it is swung to the position shown by the lowermost dotted lines in Fig. 1 with the sleeve 20 resting upon the lever 91. The weight of the brush body tilts said lever in such a manner as to lift the arm 88 and so stop the machine. When the brush body is lifted off of the lever 91, the brush immediately commences to revolve. The holder 83, on the shaft 73 in which the shifting shaft 82 is mounted, turns loosely on the shaft 73, said shaft 82 and the adjacent arm 74 being connected by a bracket or the like 93, as seen in Figs. 8 and 9, so as to move vertically as a single body.

The brush body is made rigid temporarily with the hub 20 by means of thumb screws 94, see Figs. 1, 5, 16, 18, 19 and 22, operating in conjunction with a split clamping sleeve 95 of the rear head 21 of the brush body. When in use, the brush body is slightly tilted, as shown in Fig. 10, the advance side or edge of the body being the higher. By means of this split hub and thumb screws, the body may be tilted more or less as may be desired.

The arms 74 on the shaft 73 are, as previously described, loose on their shaft, so as to swing in vertical directions thereon, they being held against longitudinal movement on the shaft by suitable means, as the collars 96, but may swing in vertical planes. These arms, with the shaft 75 and the twin cord pulleys, are supported in substantially horizontal positions by a rod 97, see Figs. 1, 2, 4 and 5, reaching upward and attached to a hanger 98 secured to the edge of the frame 59. At its lower end, this rod is attached by some simple means to the adjacent arm 74, in the present instance, this means being shown as an axial pin 99 threaded through the head of the arm and provided with a jam nut 100. This pin is shown as threaded in the end of the shaft 75, but this manner of connection is not essential as any suitable means of connection between the suspending rod 97 and the body consisting of the twin pulleys and the arm 74 would serve equally as well.

The upward pull of the cords 71 and 76 tends to raise the pulleys and the arms, which is resisted by a spiral spring 101 on the rod 97 beneath the hanger 98, as seen in Fig. 2, a nut 102 on the rod beneath the spring serving to regulate the tension thereof as may be required. The upward pull of the cords is thus resisted by the elastic action of the spring. Above the hanger 98 are a pair of jam nuts 103, by means of which the vertical position of the rod 97 may be controlled and regulated to determine or limit at any time the amount of drop of the twin cord pulleys and the arms 74.

With the parts constructed and arranged substantially as described, the operation will be apparent, especially when taken in connection with the annexed drawings. Normally, the brush is non-revolving, being supported upon the arm 91 which disengages the clutch in the manner hereinbefore described. The operator stands at the left hand of the device in Fig. 1 and grasps the handle 30 with one hand, managing the cloth with the other. In brushing the cloth, the operator swings the brush body over the cloth, as will be readily understood upon reference to Fig. 1, at intervals sliding the hub 18 longitudinally upon its guide frame 59, so as to carry the brush body endwise one way or the other to give it a sweep over a greater surface of the cloth. The brush is manipulated in the various directions until the cloth is thoroughly brushed, when the brush is put back into the lower dotted line position in Fig. 1, the cloth removed and, after another piece has been placed in position, the operation is repeated. At proper intervals, the dust drawers are removed and emptied of their contents and then placed back in position.

Modifications in detail may be resorted to without departing from the spirit of the invention or sacrificing any of its advantages.

What is claimed as new is:—

1. In a brushing machine, a revoluble brush, a head in two parts one pivotally connected with the other and in which the shaft of the brush is mounted, said head being swiveled to move in a horizontal plane and said brush carrying member being pivoted to rock at right angles to its swivel movement, and brush rotating means within said head.

2. In a brushing machine, a revoluble brush, a head in two parts one pivotally connected with the other and in which the shaft of the brush is mounted, said head being swiveled to move in a horizontal plane and said brush carrying member being pivoted to rock at right angles to its swivel movement, and brush rotating means within said head, said head being mounted for reciprocation horizontally.

3. In a brushing machine, a frame, a revoluble brush, a head slidingly mounted on the frame and in which the brush shaft is mounted, brush rotating means partially within said head, a drive shaft, clutch mechanism connecting the drive shaft with the brush rotating means, and means for holding the clutch mechanism in inoperative position by the weight of the brush.

4. In a brushing machine, a revoluble brush, a swivel head in which the shaft of said brush is mounted, brush revolving means partially within said head, a clutch mechanism for starting the brush, a pivoted lever in position to be engaged by said shaft to stop the revolution of said brush, and mechanism connecting said lever with said clutch.

5. In a brushing machine, a revoluble brush, a slidingly mounted swivel head in which the shaft thereof is mounted, a supporting frame for said head a driving pulley for said shaft carried by said swivel head, and a driving cord passed over said pulley in the head.

6. In a brushing machine, a revoluble brush, a slidingly mounted swivel head in which the shaft thereof is mounted, a supporting frame for said head a driving pulley for said shaft carried by said swivel head, and a driving cord passed over said pulley in the head, said head being mounted for rocking movement.

7. In a brushing machine, a revoluble brush, a swivel head in which the shaft thereof is mounted, and a reciprocably mounted support for the article to be brushed.

8. In a brushing machine, a revoluble brush, a swivel head for the shaft thereof mounted for reciprocation, and a support for the articles to be brushed also mounted for reciprocation.

9. In a brushing machine, a revoluble brush, a head for the shaft thereof mounted for reciprocation, a support for the articles to be brushed also mounted for reciprocation, and a clutch device and means whereby said clutch device is controlled by the position and weight of the brush, a pivoted lever in the path of and adapted to receive the brush, and means connected with said lever to stop the machine.

10. In a brushing machine, a revoluble brush, a head for the shaft thereof mounted for reciprocation, a support for the articles to be brushed also mounted for reciprocation, and a clutch device and means whereby said clutch device is controlled by the position and weight of the brush, a pivoted lever in the path of and adapted to receive the brush, and means connected with said lever to stop the machine, said head being mounted for rocking movement.

11. In a brushing machine, a revoluble brush, a shaft, a housing therefor having openings, and dust receptacles supported in extensions of said housing and having openings in communication with the first-named openings, said receptacles being disposed longitudinally of the housing upon opposite sides of the brush.

12. In a brushing machine, a revoluble brush, a housing therefor having openings, dust receptacles supported in extensions of said housing and having openings in communication with the first-named openings, said receptacles being disposed longitudinally of the housing upon opposite sides of the brush and means for detachably retaining said receptacles in place.

13. In a brushing machine, a revoluble brush, a housing therefor having an opening, guards traversing said opening with one end freely guided in the housing, and means for tilting the brush body more or less as required.

14. In a brushing machine, a revoluble brush, a housing therefor having an opening, wire guards traversing the opening and fixed at one end to the casing, and a chamber carried by the housing upon one side of the opening and having openings for the reception of the free ends of the guards.

15. In a brushing machine, a revoluble brush, a housing therefor having an opening, wire guards traversing the opening and fixed at one end to the casing, and a chamber carried by the housing upon one side of the opening and having openings for the reception of the free ends of the guards, said free ends being bent at an angle and received within said chamber.

16. In a brushing machine, a revoluble brush, a slidingly mounted swivel head in which the shaft thereof is mounted, said head having a portion mounted for rocking movement, a supporting frame in which said head is mounted and means for limiting such movement.

17. In a brushing machine, a revoluble brush, and a swivel head for the shaft of said brush, said head composed of two parts, one pivotally mounted upon the other, and means for limiting the pivotal movement.

18. In a brushing machine, a revoluble brush and a swivel head for the shaft thereof, said head comprising two parts, one pivotally mounted upon the other and the last-named mounted for reciprocation.

19. In a brushing machine, a revoluble brush, a swivel head for the shaft thereof, said head comprising two parts, one pivotally mounted upon the other and the last-named mounted for reciprocation, and means for limiting the movement of the pivoted part.

20. In a brushing machine, a revoluble brush, a swivel head for the shaft thereof, said head comprising two parts, one pivotally mounted upon the other and the last-named mounted for reciprocation, and means for limiting the movement of the pivoted part, said pivoted part having its under face cut away.

21. In a brushing machine, a revoluble brush, a slidingly mounted swivel head for the shaft thereof, a pulley carried by said head and attached to the shaft, a rope passed around said pulley for rotating said pulley and a supporting frame in which said head is mounted.

22. In a brushing machine, a revoluble brush, a swivel head for the shaft thereof, a pulley carried by said head and attached to the shaft, means for rotating said pulley, and an article-support mounted for reciprocation.

In witness whereof, I have hereunto set my hand this 16th day of September, 1909, in the presence of two subscribing witnesses.

JOHN F. FROMM.

Witnesses:
E. B. WHITMORE,
A. M. WHITMORE.